United States Patent [19]

Longfield

[11] Patent Number: 5,193,057
[45] Date of Patent: * Mar. 9, 1993

[54] ELECTRONIC INCOME TAX REFUND EARLY PAYMENT SYSTEM WITH MEANS FOR CREATING OF A NEW DEPOSIT ACCOUNT FOR RECEIPT OF AN ELECTRONICALLY TRANSFERRED REFUND FROM THE IRS

[75] Inventor: Ross N. Longfield, Far Hills, N.J.

[73] Assignee: Beneficial Franchise Company Inc., Wilmington, Del.

[*] Notice: The portion of the term of this patent subsequent to Dec. 26, 2006 has been disclaimed.

[21] Appl. No.: 615,903

[22] Filed: Nov. 20, 1990

Related U.S. Application Data

[63] Continuation of Ser. No. 384,654, Jul. 25, 1989, which is a continuation of Ser. No. 146,324, Jan. 20, 1988, Pat. No. 4,890,228.

[51] Int. Cl.$^5$ ............................................. G06F 15/30
[52] U.S. Cl. ..................................... 364/408; 364/401
[58] Field of Search ............................... 364/401, 408

[56] References Cited

U.S. PATENT DOCUMENTS

| | | |
|---|---|---|
| 4,321,672 | 3/1982 | Braun et al. . |
| 4,376,978 | 3/1983 | Musmanno et al. . |
| 4,597,046 | 6/1986 | Musmanno et al. . |
| 4,648,037 | 3/1987 | Valentino . |
| 4,694,397 | 9/1987 | Grant et al. . |
| 4,736,294 | 4/1988 | Gill et al. . |

OTHER PUBLICATIONS

"New Technology Lets Your Fingers Do the Banking" Washington Post, Dec. 18, 1988.
"IRA Watch: Telephone Center is Chase's IRA Entry", American Banker, Apr. 12, 1984, p. 221, abstract.
"Bankers and the Fear of Flying", Fisher John, Economic Review vol. 67 No. 7, pp. 58-62 Jul. 1982 (Abstract AN:82-18915, Inform of Orbit).
"Chemical Switches on Pronio, New Home-Banking System", Ad Forum, vol. 4, No. 9, p. 63 Sep. 1983 Lp.AN:83-26924 Inform of Orbit.
Specifications for Electronic Filing of Individual Income Tax Returns (Tax Year 1986); dated Oct. 15, 1986; author Internal Revenue Service-Research Division.
Specifications For Direct Deposit of Individual Income Tax Refunds (Tax Year 1986); dated Oct. 15, 1986; author Internal Revenue Service-Research Division.
Request to Reopen and Modify Consent Order; dated May 27, 1986; by Beneficial Management Corporation.
H&R Block Rapid Refund Advertisement-alleged to have been distributed prior to Jan. 20, 1987 by H&R Block.

Primary Examiner—Gail O. Hayes
Attorney, Agent, or Firm—Connolly & Hutz

[57] ABSTRACT

Electronic data processing system for preparation of electronically filed tax returns and authorization and payment of refunds based on the data supplied in those returns. Electronic data processing programs are provided for creating an electronic tax return that is filed with a tax collecting authority. At the same time as the electronic tax return is created, a loan application is processed to create an electronic deposit/loan account for the tax filer at an authorized credit institution. As early as the day after completion of the tax return and loan application, the tax filer receives initial refund payment from the loan account. The authorized credit institution electronically files the electronic tax return with the tax collecting authority which processes the return and transfers by electronic fund transfer the refund amount to the deposit/loan account at the authorized credit institution. Any refund in excess of the initial refund payment is then forwarded to the tax filer. Provision is also made for checking the credit worthiness of the tax filer.

5 Claims, 1 Drawing Sheet

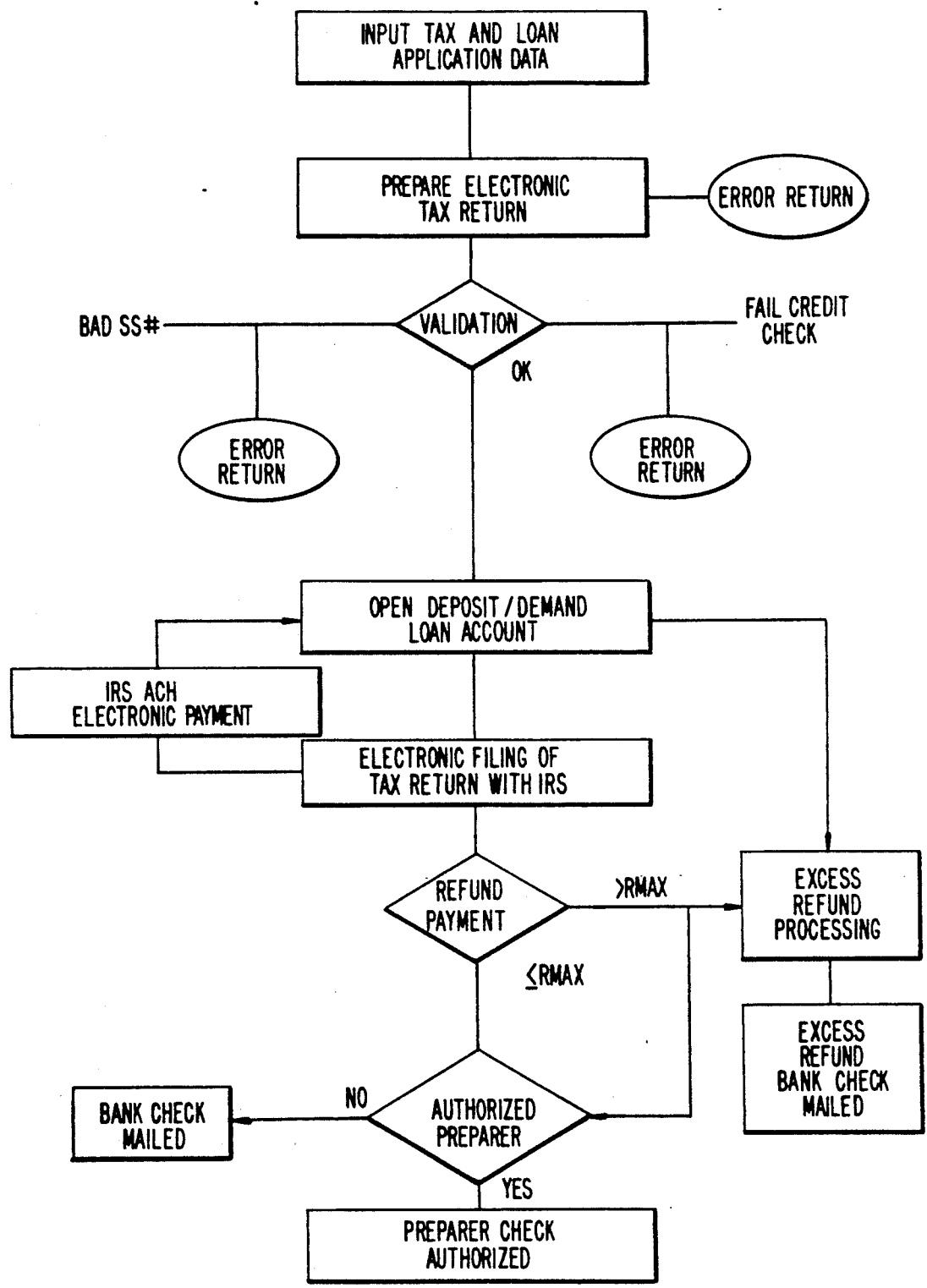

ELECTRONIC INCOME TAX REFUND EARLY PAYMENT SYSTEM WITH MEANS FOR CREATING OF A NEW DEPOSIT ACCOUNT FOR RECEIPT OF AN ELECTRONICALLY TRANSFERRED REFUND FROM THE IRS

This is a continuation of Ser. No. 384,654 filed Jul. 25, 1989 which is a continuation of Ser. No. 146,324, filed on Jan. 20, 1988 now U.S. Pat. No. 4,890,228.

BACKGROUND OF INVENTION

This invention relates to a data processing system for use on programmable data processing machines. More particularly, the invention comprises a data processing program for the preparation of tax returns, for electronic filing thereof with a taxing authority and data processing programs for creating a deposit/loan account at an authorized financial institution for providing immediate payment of tax refunds based on such prepared and filed returns. The deposit/loan account is created with the capability of receiving electronic fund transfer deposits directly from the taxing authority.

In recent years, taxing authorities have increasingly automated the tax collecting and tax return filing process. In particular, the United States Internal Revenue Service has instituted a system for the electronic filing of tax return data. In conjunction with that system, the IRS has arranged to pay refunds by electronic funds transfer using the Treasury ACH origination system. While this has greatly improved the tax filing and refund process it still requires a period of three to six weeks from the filing of an individual's tax return to the time of receipt of a refund check.

In contrast, the system of the invention shortens the time from filing to receipt of a refund to as little as one day. Additional advantages and features of the instant invention will become more readily apparent from the following detailed description of a specific illustrative embodiment thereof presented hereinbelow in conjunction with the accompanying drawing and appendices.

BRIEF SUMMARY INVENTION

The present invention is a unique combination of data processing programs resulting in a data processing system that provides a tax refund payment within 24–48 hours from the time of filing a tax return. In the present embodiment an Electronic Filing Program prepares a 1040, 1040A or 1040EZ federal tax return acceptable for electronic transmission to the United States Internal Revenue Service, on the basis of tax filer provided data. At the same time, the tax filer applies for a refund loan and, on the basis of filer provided credit data, a deposit/loan account is opened at a authorized financial institution. In a preferred use of the system of the invention, the entire transaction takes place at the offices of an authorized tax return preparer. Such a use of the system provides the tax filer with the benefit of having a tax return prepared and filed on one day and picking up a check at the same office for any refund due, less tax preparation fees and filing fees, on the next day; all without an out of pocket payment by the tax filer.

The specific embodiment of the data processing system of the invention is disclosed in the form of program flow charts enabling a skilled programmer to write programs in any of a variety of computer programming languages (e.g., COBOL) which can be executed on any of a number of data processing machines. It is also anticipated that programs equivalent to the disclosed programs can be written by those skilled in the art to achieve the unique benefits of the data processing system of the invention.

BRIEF DESCRIPTION OF THE DRAWINGS

FIG. 1 is schematic flow diagram of data processing functions of invention.

DETAILED DESCRIPTION OF THE INVENTION

Referring now to FIG. 1 here shown in schematic flow diagram form overall depiction of the data processing functions for implementing the invention. Input means 10 is used for inputting tax taxpayer identification, taxpayer tax return information and refund anticipation load information. In preferred embodiment input means 10 comprises and intelligent terminal such as a personal computer having programmable data processing arithmetic and logical functions a keyboard visual monitor data storage and data transmission capabilities. Data input using such an input means is hereinafter described in more detail.

Once data input is complete, a program process is executed by a data processing means to create electronic tax return files 20 which are in a form accepted by the taxing authority processing the taxpayer tax return. In the present embodiment a program flow chart of an Electronic Filing Program for preparing 1040, 1040A and 1040EZ tax returns in electronic format acceptable to the United States Internal Revenue Service comprises Microfiche Appendix I hereto. It is also necessary to validate tax return data and loan application data as is shown in block 30. Validation of tax return data including mathematical checking is performed by the Electronic Filing Program of Microfiche Appendix I. In addition, individual identification data is compared to a file containing credit information to identify individuals with unacceptable credit histories.

When validation is complete, a deposit/loan account 40 is created at a authorized financial institution, e.g., bank, financial union, Savings and Loan Association, etc., that issues advance payments of taxpayer refunds. To accomplish this in the present embodiment the authorized financial institution programs a data processor means in accordance with the program flow chart of Microfiche Appendix II which is more fully described hereinafter.

After creation of the deposit/loan account file 40, the tax return data is electronically filed with the taxing authority as indicated in block 50. In the present embodiment, the taxing authority is the IRS and the tax preparer and return data is supplied via electronic transmission to designated IRS computers. This data also includes identification of the deposit/loan account which is designated to receive electronic fund transfer refunds directly from the IRS through the Treasury Department's ACH system.

As soon as the validated tax return data and loan application data have been processed and a refund amount is determined, the refund loan payment procedure 60 is initiated. The payor authorized financial institution may have set a maximum amount (Rmax), for example $2,500, which it will immediately pay out as a refund loan. Therefore a determination is made as to whether or not the claimed refund exceeds this amount. If that is the case, excess refund processing is entered and an excess refund payment 80 is generated when the electronic funds payment is received. Simultaneously, the maximum authorized amount of refund anticipation loan is processed by determining whether or not payment is to be made through an authorized preparer 90 or directly by the authorized financial institution 100. In the case of an authorized preparer a financial institution check is issued by the preparer for delivery the next day. In the case of direct payment by the authorized financial institution, a check is mailed to the tax filer the next day. The foregoing constitutes an overall description of the data processing system of the invention.

Returning now to the Electronic Filing Program 20 of the present embodiment which is set forth in the program flow charts of Microfiche Appendix I. The Electronic Filing Program (EFP) is designed to be used by tax preparers having an intelligent terminal input means 10. The program enables preparers 20 to electronically enter tax returns and transmit them to a remote processing center. The remote processing center gathers tax returns from many tax preparers and collectively transmits them to the IRS. The System Specifications of the EFP are divided into four main sections these sections describe the tax preparers duties and systems operations as they pertain to 1. SYSTEM INITIALIZATION, 2. DATA ENTRY, 3. TRANSMIT, and 4. FOLLOW-UP.

The system initialization process is designed to make it as easy as possible for the tax preparer. It sets up all the files required by the EFP software, and guides him through the terminal screen provided for the entry of the tax preparer information (Microfiche Appendix I). The system is designed for the entry of the tax preparer information separately so that it needs only be entered once, but provides the tax preparer the opportunity to change this information if needed. In the present embodiment, such tax preparer data is in the form required by the IRS for preparers eligible to file tax return data electronically.

The tax preparer gathers all the necessary information from a client to file a tax return. The EFP can handle the three basic tax returns, 1040, 1040A, and 1040EZ and certain supported schedules and forms. The tax preparer then goes to his intelligent terminal and enables the EFP program.

After the preparer has completed the 1040, 1040A or 1040EZ form by following the input procedures, the EFP software performs two major functions. First, it determines the presence of errors in the entry of most of the major fields. Second, it determines from the information entered on the 1040 if any of the supported forms or schedules are required. If any of the supported forms or schedules are required it automatically brings to the screen the required data entry format for completion by the preparer.

After the preparer has entered all of the information for the 1040, 1040A, or 1040EZ, and all related forms and schedules, the software automatically displays a summary screen.

The preparer then enters his code on the summary screen and the system automatically displays all of the information from the preparer file. The information on the preparer file is entered only once and can be updated as needed by using option seven from the main menu. It is attached to each tax return through the summary screen. The summary screen also provides for the input of authorized financial institution route information and displays a list of the required documents.

When the summary screen is completed the system displays the screen for the entry of W-2 information.

When all of the required W-2's have been completed the software automatically returns to the main screen. At this time the preparer can either enter another 1040, 1040A, or 1040EZ, or select which returns are to be transmitted to the remote processing center.

After all required tax returns have been entered the preparer can transmit the returns to the remote processing center. This is accomplished by selecting the 'NEW TRANSMISSION FILE' entry from the main screen. When this item is selected the transmit screen is displayed, the preparer indicates the returns to be transmitted by changing the status code on the transmit screen to 'T'. The system then adds these tax returns to the transmit file, dials the remote processor center number, and transmits the data over either dedicated or ordinary telecommunication lines.

The week after a tax return has been accepted by the IRS, the preparer must ship a form 8453 and supporting documents such as W2's to the IRS. IRS rejected returns are corrected by the central processing center unless the tax meaning of the return would be altered, in which case the preparer is informed and asked to reprocess the return.

In the present embodiment the validation 30, account file creation 40 electronic filing 50, and refund payment processing 60, 70, 80, 90 and 100 are all performed at the remote processing center. These functions are performed by data processing programs created in accordance with appendix II hereto. In overview this embodiment of the system of the invention permits a taxpayer to obtain a refund loan within one or two days of filing his tax return through an authorized preparer directly or by mail from the participating authorized financial institution. This is in contrast to the typical 6 to 8 weeks required to receive a refund directly from the IRS. Rapid refund payment is accomplished by the authorized financial institution issuing to the tax filer a demand loan for an amount of the tax filer's calculated IRS refund. This loan is in the form of a check issued by the authorized financial institution and has the loan terms on the check document. A deposit account is opened for the customer at the authorized financial institution to which the tax filer's IRS tax refund is sent via the IRS electronic funds transfer ACH system. This IRS refund payment, when received is automatically applied as payment of the tax filer's loan, paying it off, assuming that none of the refund was withheld by the IRS. In the event that a cap has been set by the lender, any refund in excess of the amount of the loan is subsequently issued in an additional check for that excess amount and mailed to the tax filer. To accomplish this in the Refund Anticipated Loan (RAL) system of the embodiment of Microfiche Appendix II,, an issue file will be transmitted from the remote processing center. Multiple files are allowed on a daily basis. This file will be posted to a masterfile on the authorized financial institution data processing means, in this instance an NCR 8250. Validation will be performed on the file received from the remote processing center. Fields validated include the Social Security Number field for numerics and non duplicate Social Security Number, the amount file for numerics and the Name and Address filed for Alpha/Numerics. The individual items and amounts are summed up and compared against the trailer record for control. The loan application is also compared to a master credit data file to validate the credit worthiness of the applicant tax filer. A failure of this test will result in an error return to the originating tax preparer the next day. The RAL refund checks are generated from the file transmission and update. The checks are mailed within 24 hours from receipt of file from the authorized financial institution or in the case of authorized preparers will be issued the next day by the preparer. Four reports are generated by this program. They are the Input Validation, Update Report, RAL Checks, and Check Register.

Each day three reconciliations are performed against the RAL Masterfile. One is for the clearing of the cashed RAL checks. The information from all captured bank checks is searched and RAL refund check information extracted. This is posted against the RAL Masterfile. The checks are matched by serial number to the RAL Masterfiles Serial Number to insure that the amount cleared equals the amount issued. All exceptions are noted as an exception for manual exception item handling. All validated checks are posted against the RAL Masterfile, and the date cleared is stored.

A second reconciliation is performed daily. This is a reconciliation against all incoming IRS ACH items. The IRS ACH Incoming file is searched for RAL IRS Tax Refunds. This is keyed off of the account number field in the IRS ACH record. A unique constant eight digit number followed by the tax filer's Social Security number is used in the Account Number field for the IRS ACH Refund. Based upon this unique number, the IRS ACH items are searched and information pulled for validation and update to the RAL Masterfiles. Four reports are generated. They are the IRS ACH RAL Validation Report, the Update Report, Excess Refund Checks, and Excess Refund Check Register. These Excess Refund Check Issues are posted to another reconciliation masterfile.

A third reconciliation is made for the Excess Refund Checks. This is a basic reconciliation system. Each day all data from the captured checks is searched and Excess Refund check information is extracted to post against the Excess Refund reconciliation Masterfile. Again two reports are generated, one is a Validation Report and the second an Update Report.

On a periodic basis, a program is run to strip off from the RAL Masterfile and Excess RAL Refund Masterfile, all completely cleared items to a history file.

Having described the unique properties of the system of the invention and without limitation illustrated the invention in a specific embodiment;

APPENDIX 1
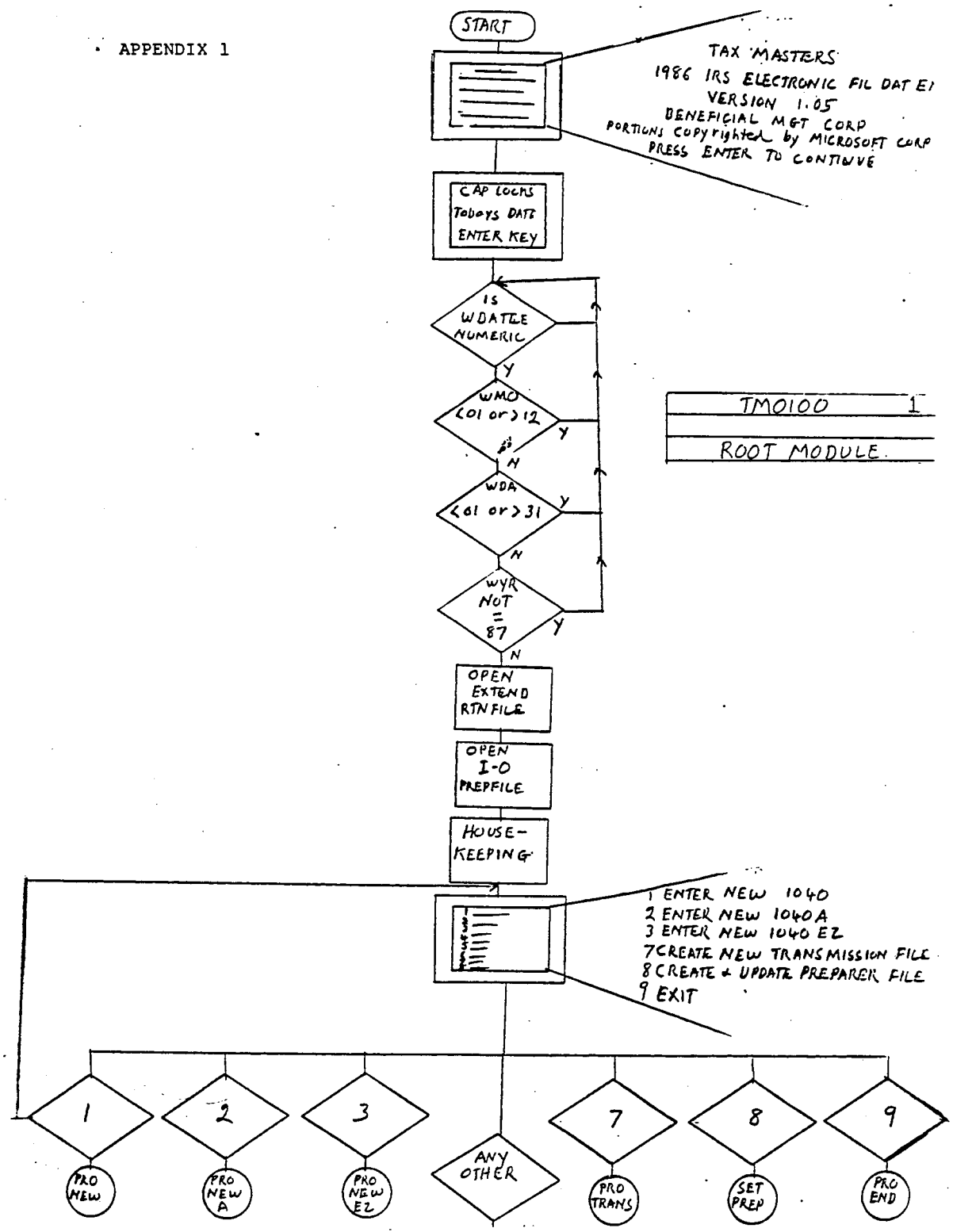

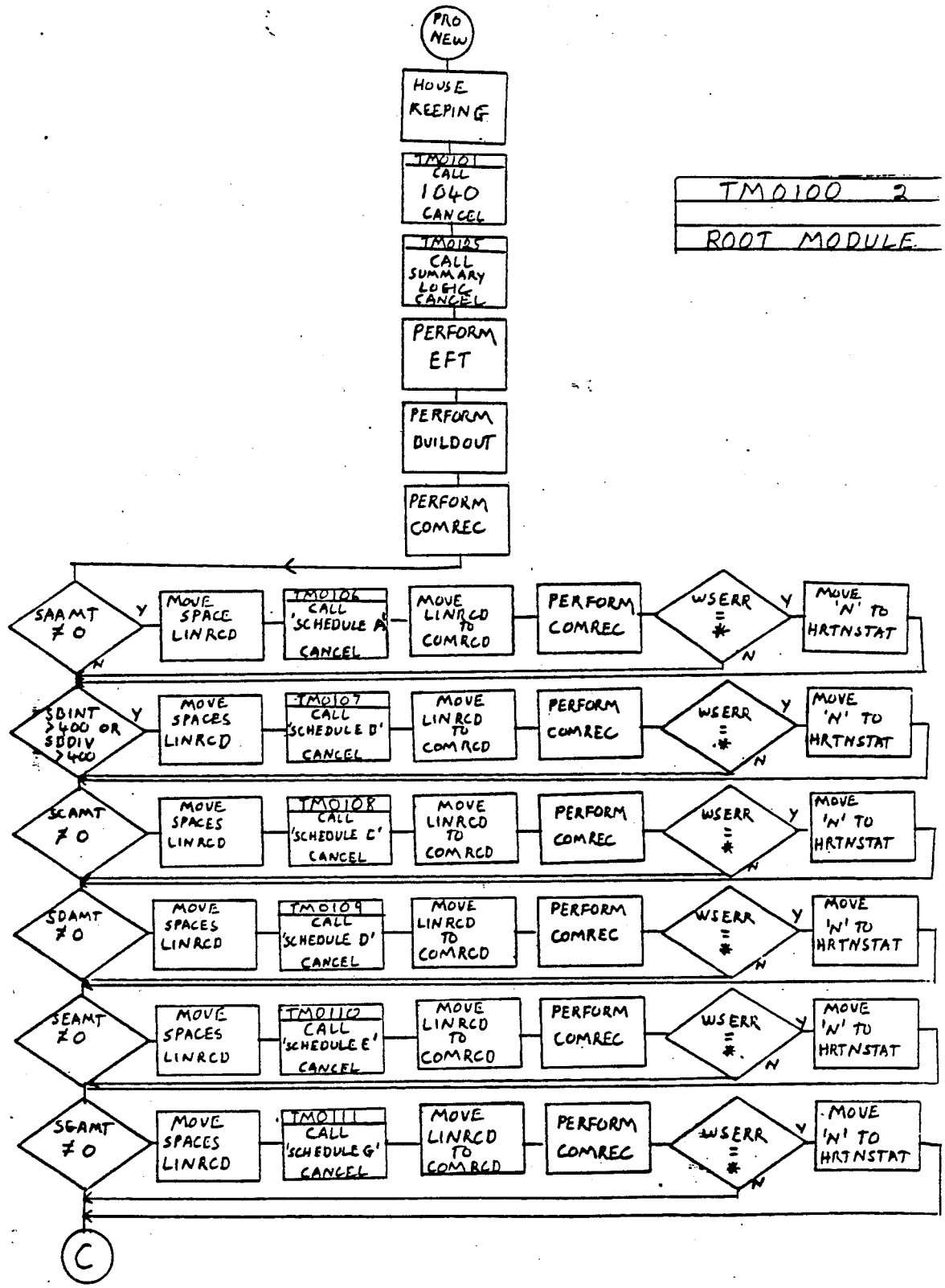

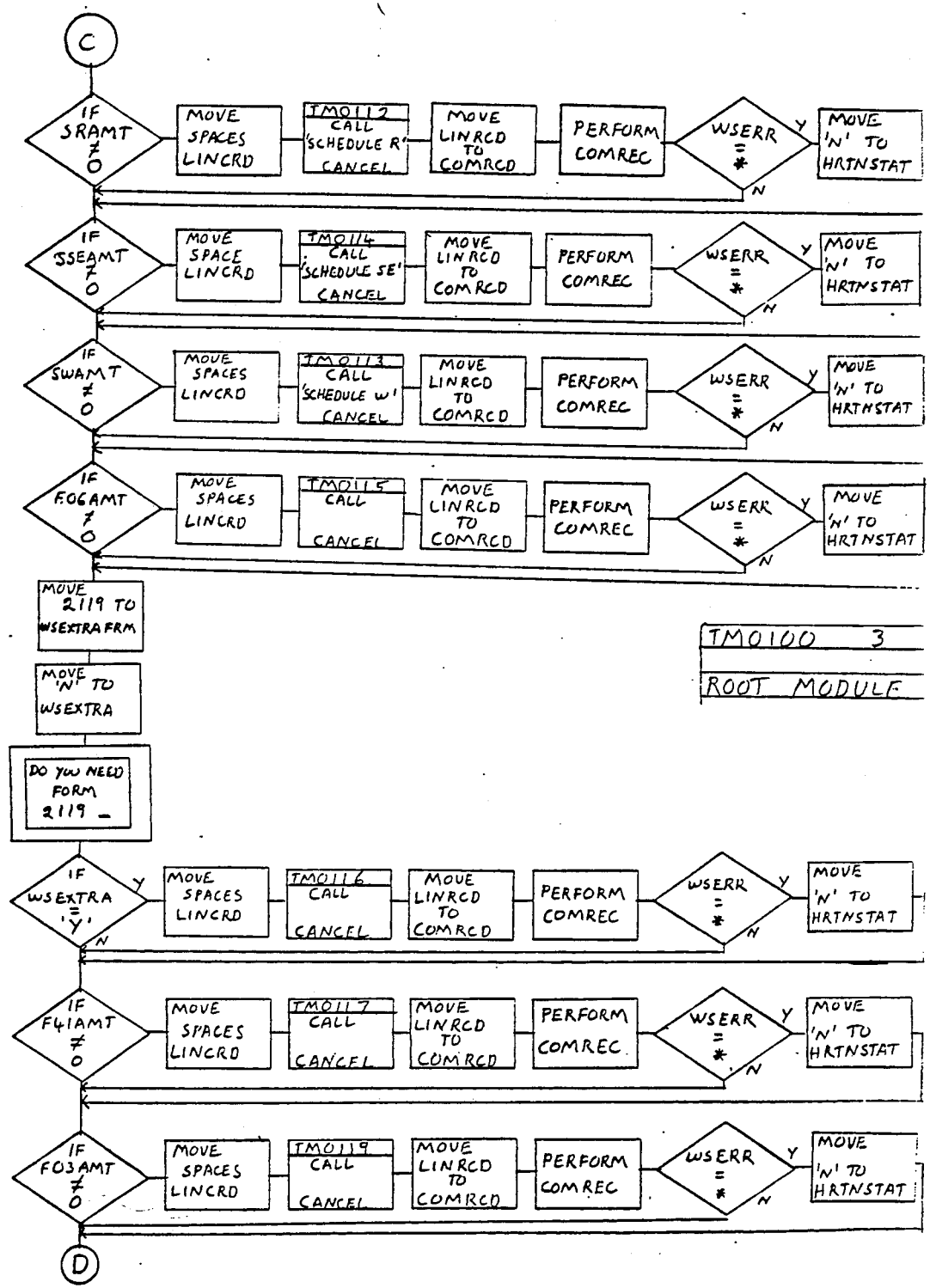

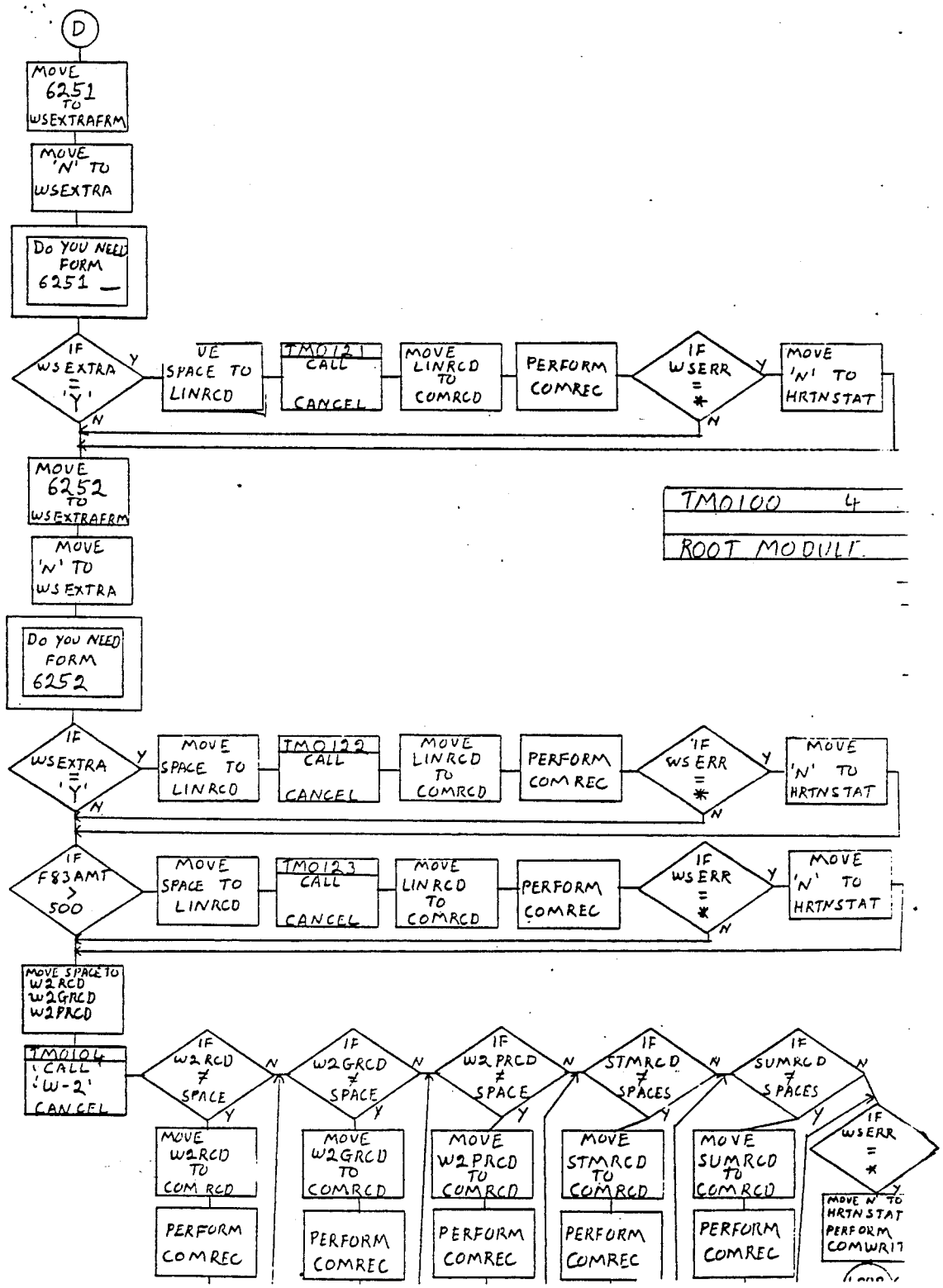

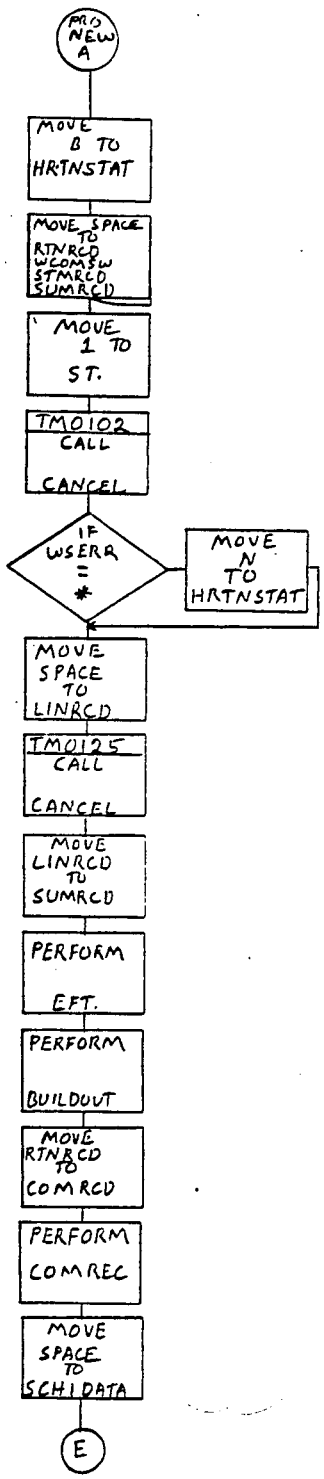
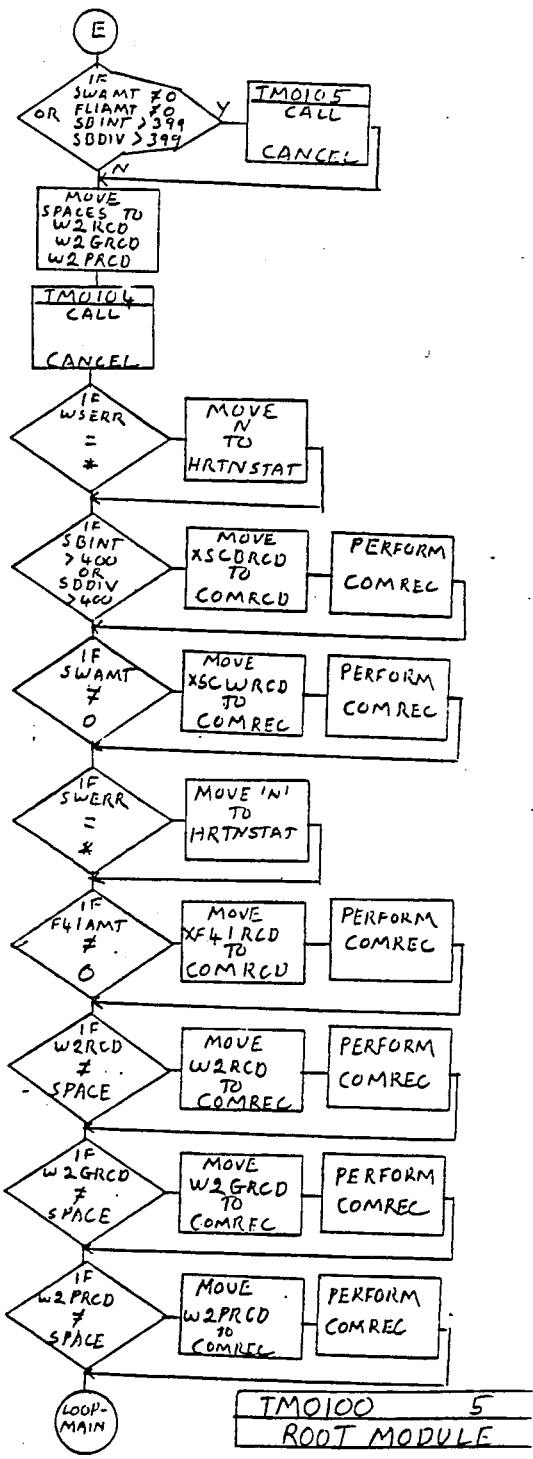
TM0100 5
ROOT MODULE

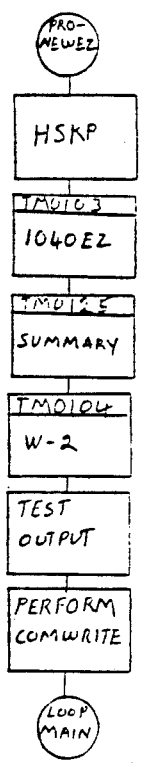
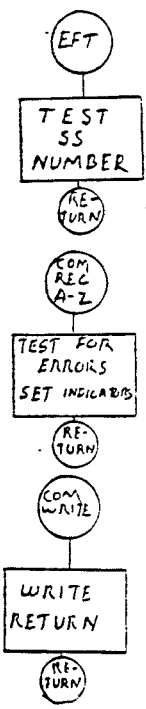
| TM0100 | 6 |
|---|---|
| ROOT MODULE | |

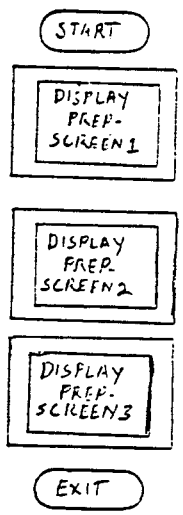
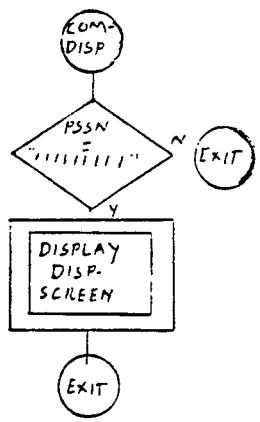
| TM0127 |
|---|
| PREPARER FILE LOGIC |

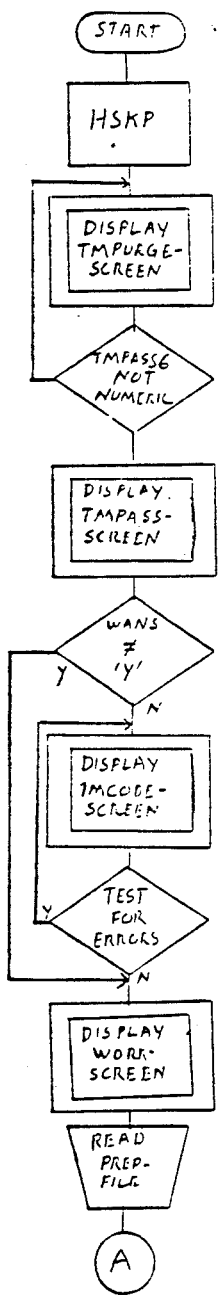
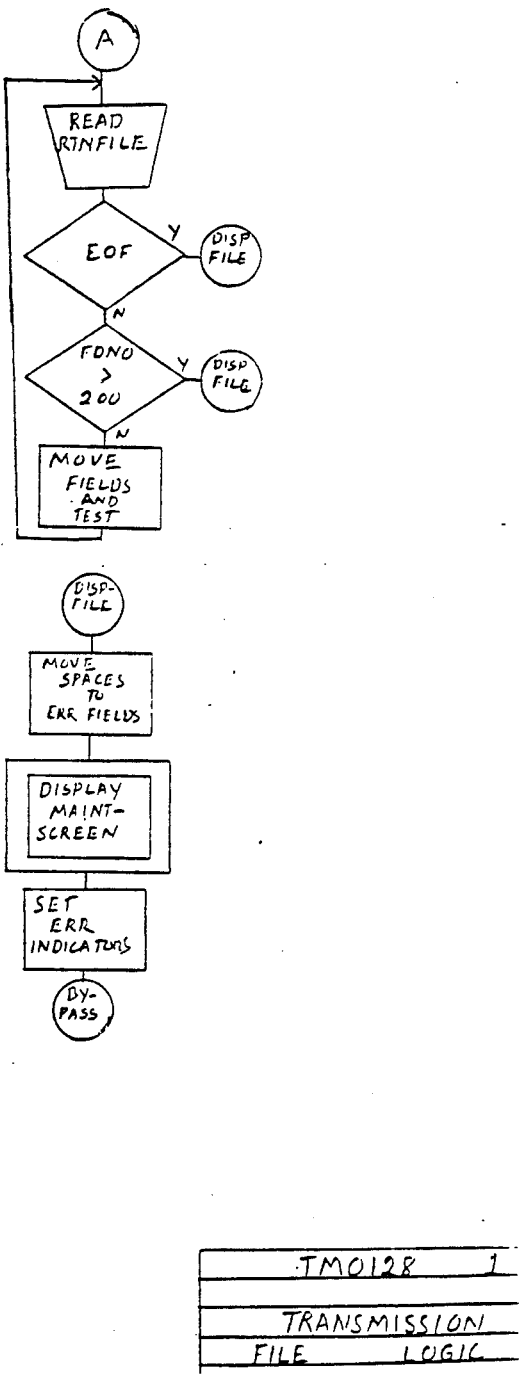

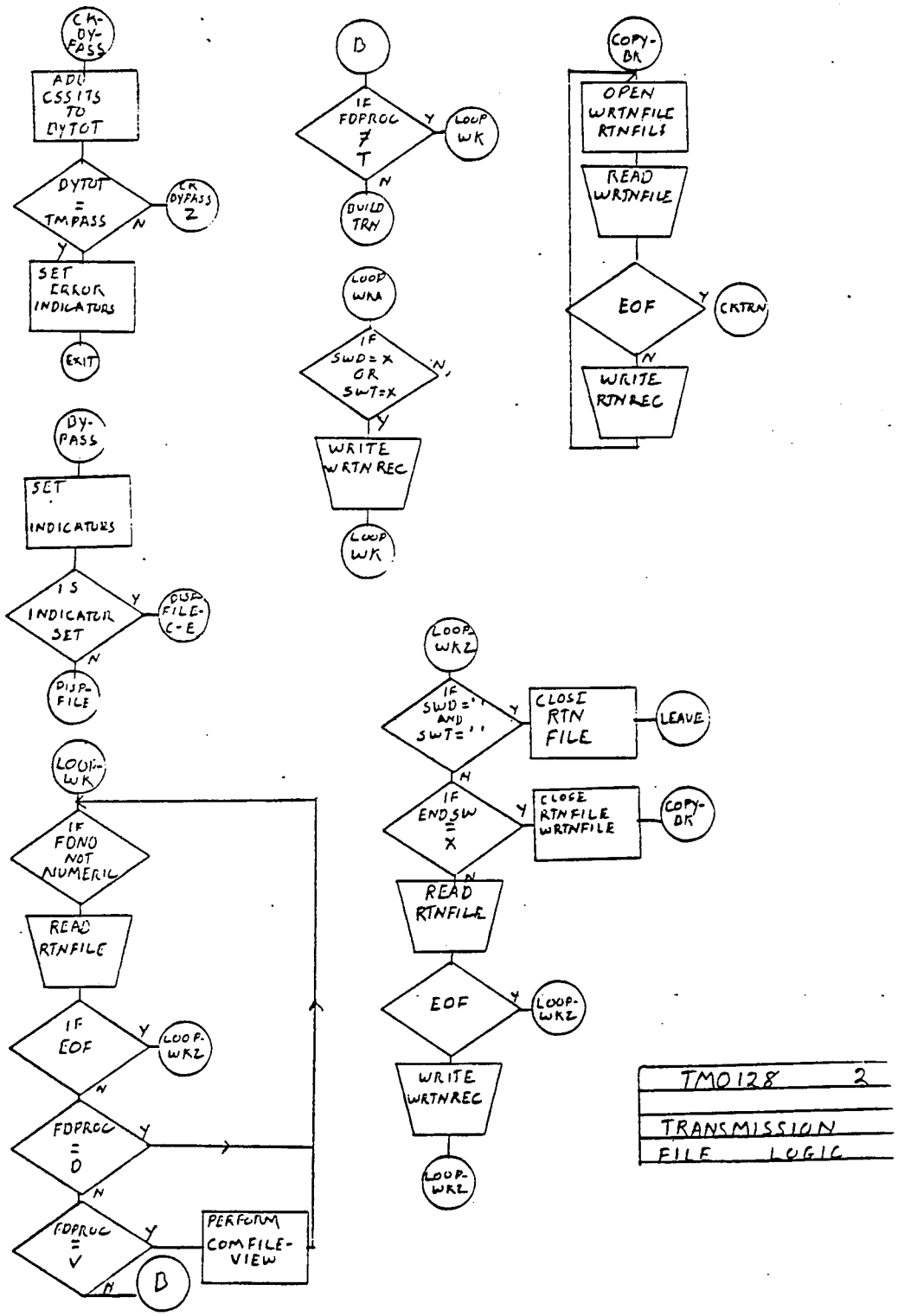

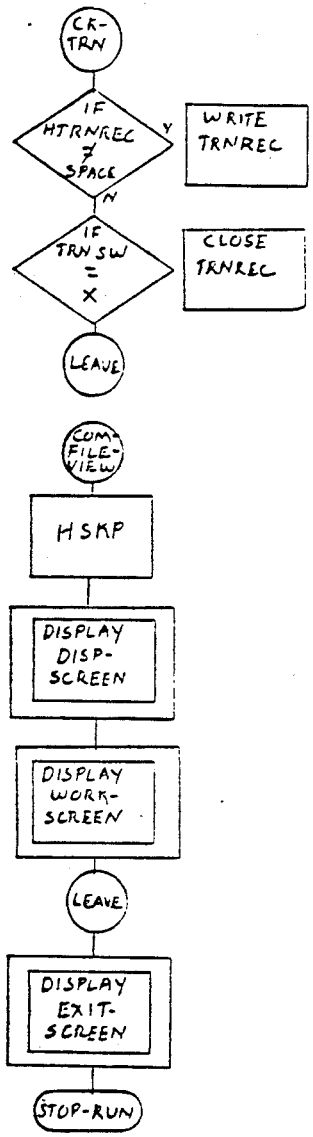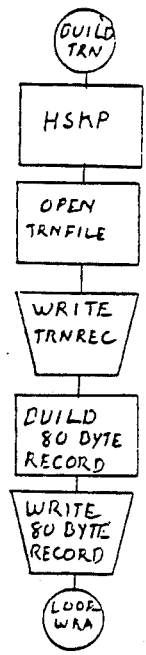
| TM0128 | 3 |
|---|---|
| TRANSMISSION | |
| FILE LOGIC | |

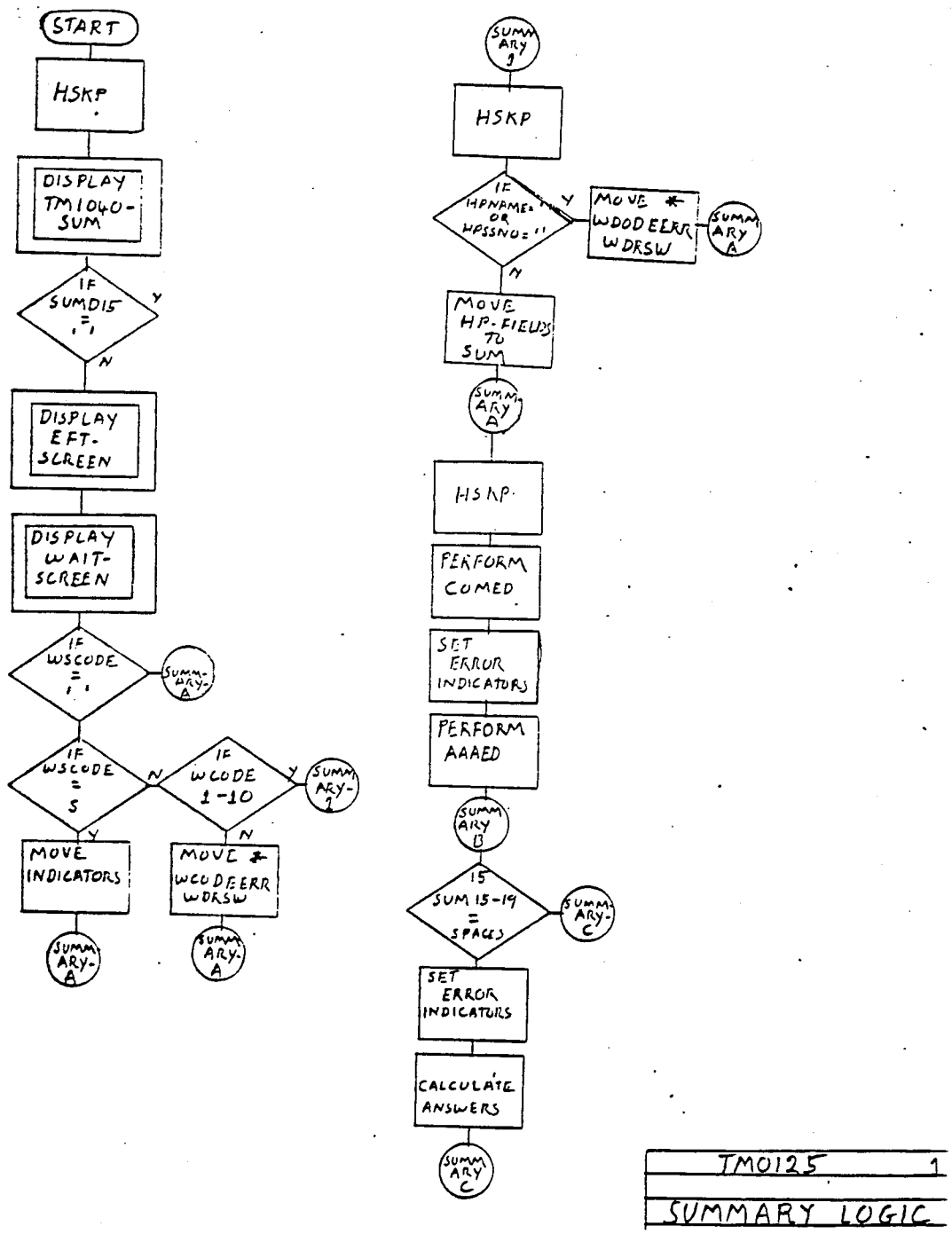

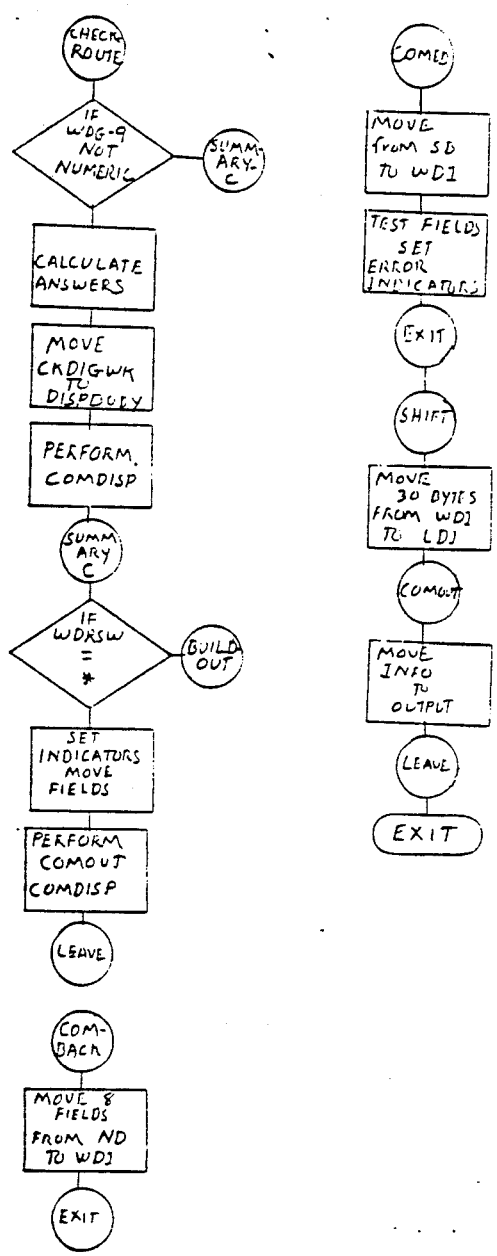
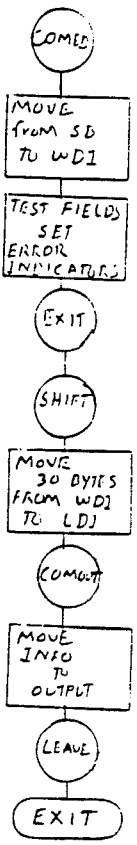
TM0125  2
SUMMARY LOGIC

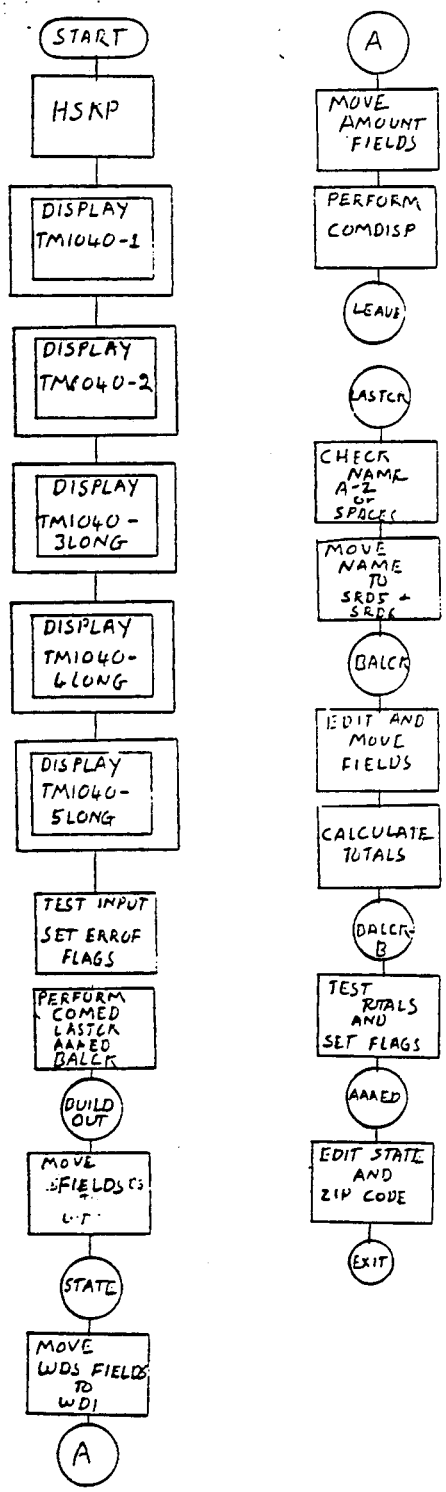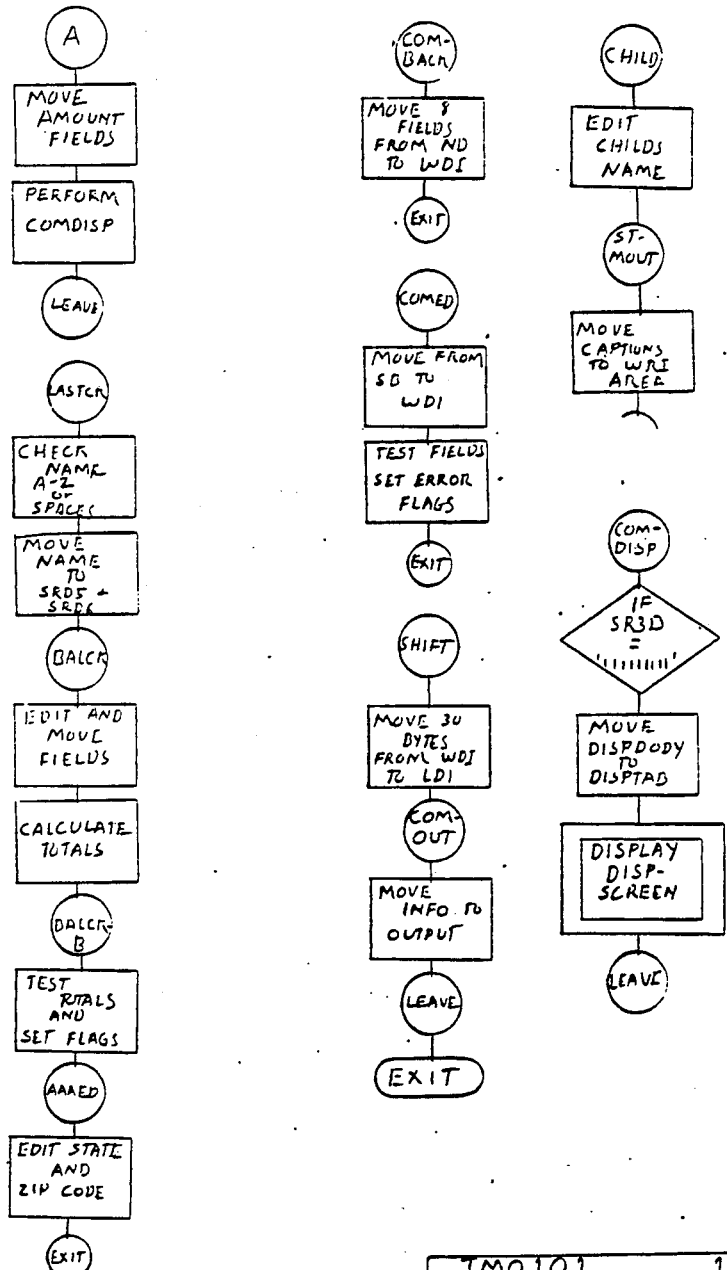

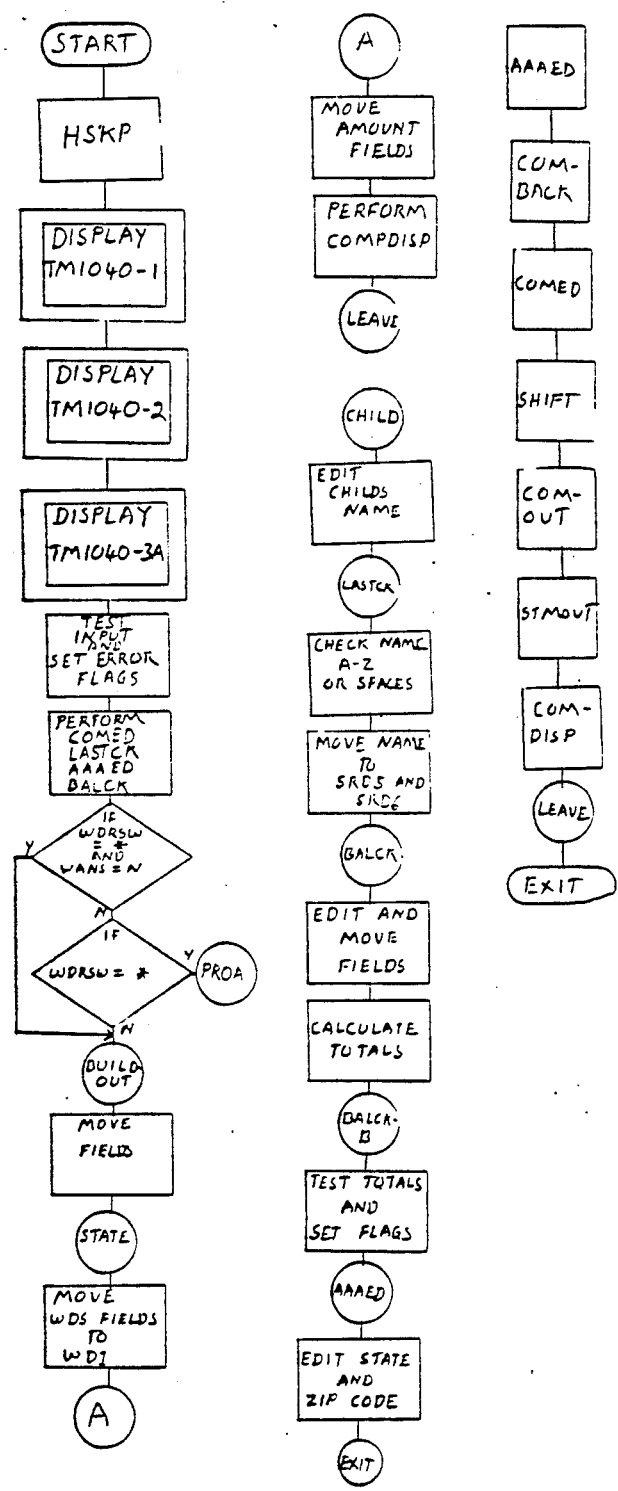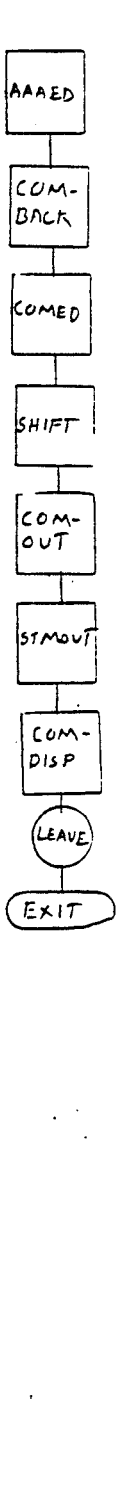

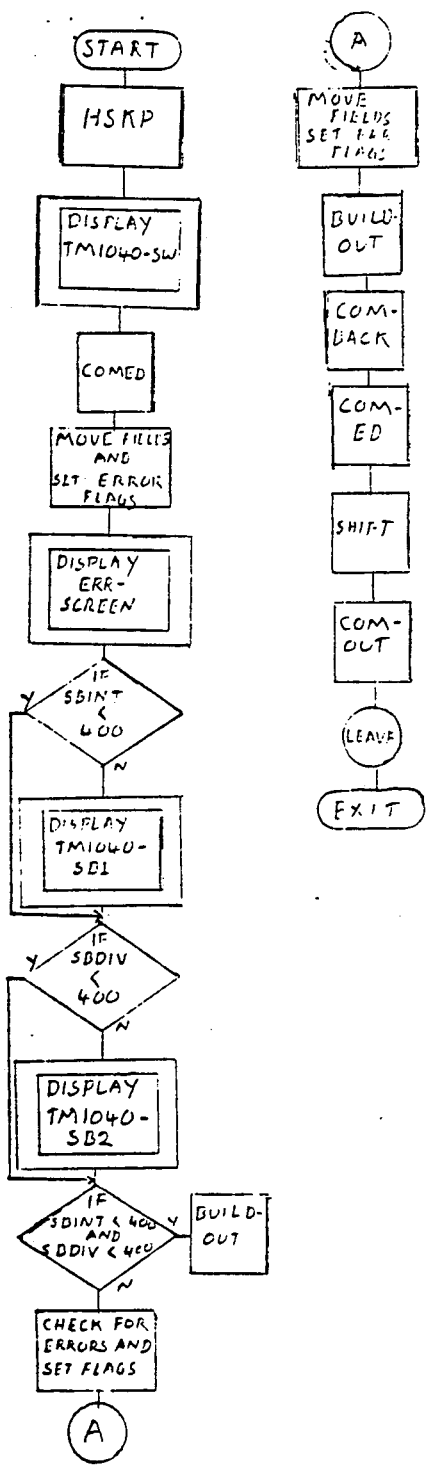
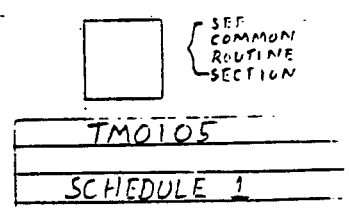
TM0105
SCHEDULE 1

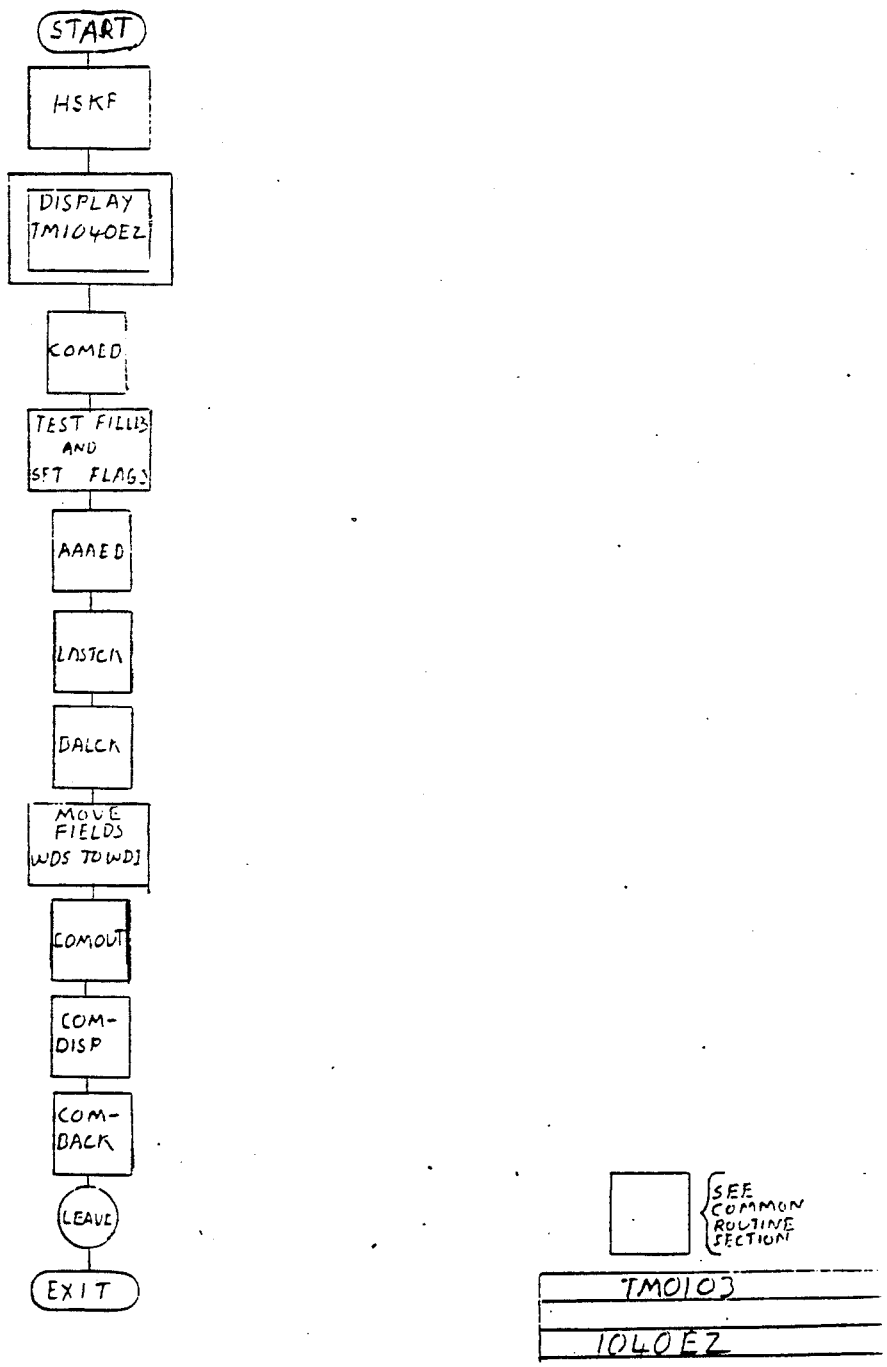

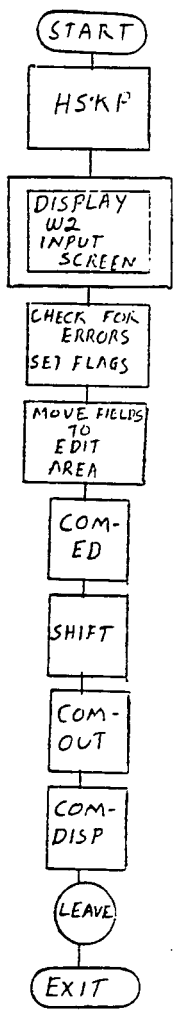
TM0104
W-2 LOGIC

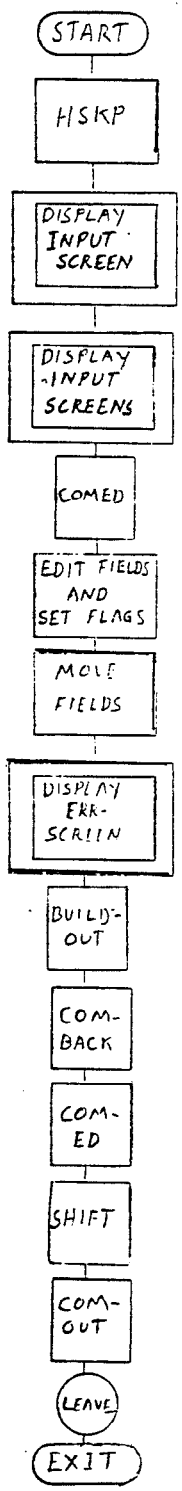

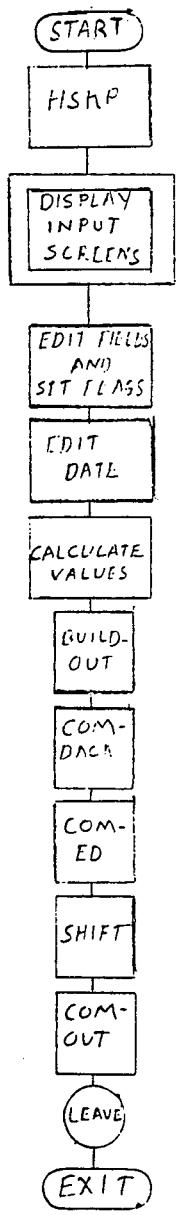
```
TM0115  TO  TM0123
FORMS  2106, 2119, 2441, 346.
       3903, 4562, 6251, 625.
AND  8283.
```

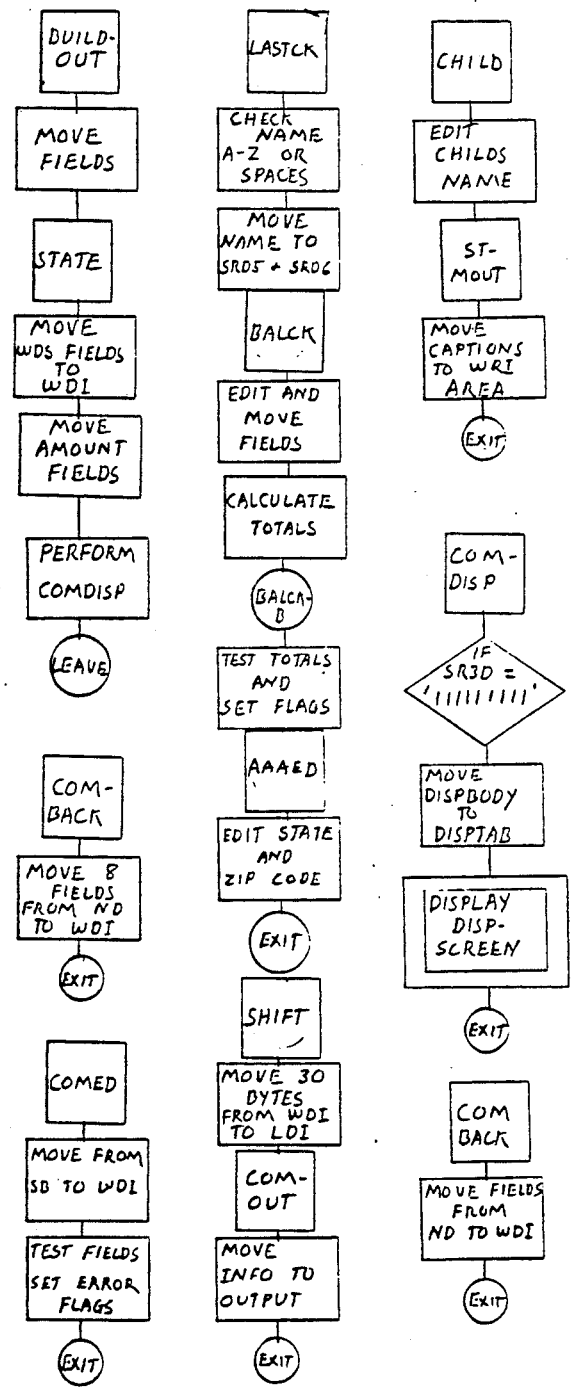

APPENDIX II

Page 1 of 7

Program: Refund Anticipation Loan
Data Files Setup
Prepared by: Nick
Date: Dec 18, 86  Page: 1 of 1

Unit 1
RALMASTER1    256 BYTES/RECORD
REFUND MASTER 1

Unit 3
RALMASTER2    256 BYTES/RECORD
EXCESS REFUND MASTER 2

Unit 1
HISTORY EXCESS REFUND MASTER 2    RALHIST2    256 BYTES/RECORD

Unit 3
MINI/VIPS PROOF PACK (CLEAR ITEMS)    MIPRALC    586 BYTES

Unit 3
ACH ORIGINATION PACK (PAYOFF ITEM)    ACHRAL    94 BYTES

Unit 3
HISTORY REFUND MASTER 1    RALHIST1    94 BYTES

Unit 2
RAL INPUT DATA FILES

RALSPOOLIS (170)    RALISSUE (155)
                    RALISSRFC (255)
                    RALISSVOR (255)
RALSPOOLPY (170)    ACHFILE (94)
                    RALEXPREC (255)
                    RALEXWRK (255)
RALSPOOLCL (170)    RALCLEAR (45)
                    RALSTOP (55)
                    RALALPHA (32)
                    RALVRFY (34)

Unit 0
SYSTEM DRIVE

RAL COMMA OBJECTS
RAL CONTROL STORES    #5 RAL PROCESSING
PROCESS CONFIRM

EX MENU    #5 MISC    256 BYTES/RECORD
EX RAL(00).AD
  (RAL MENU)
EX RAL-NEWR1L    CREATE NEW FILES (INCLUDING MASTER)
EX RAL-NEWHIS    CREATE NEW HISTORY FILES
EX RAL-NEWRA1    CREATE NEW DATA FILES (ON UNIT 2)
EX RAL-CNV    COMPARE MENCON'S 2-PM CHARACTER
           TO 1-55 CHARACTERS RECORD WITH
           LAST 5 CHARACTERS UNUSED

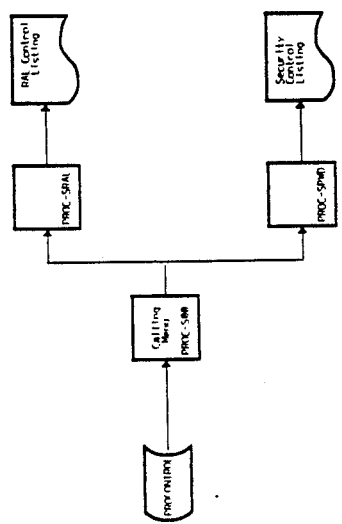

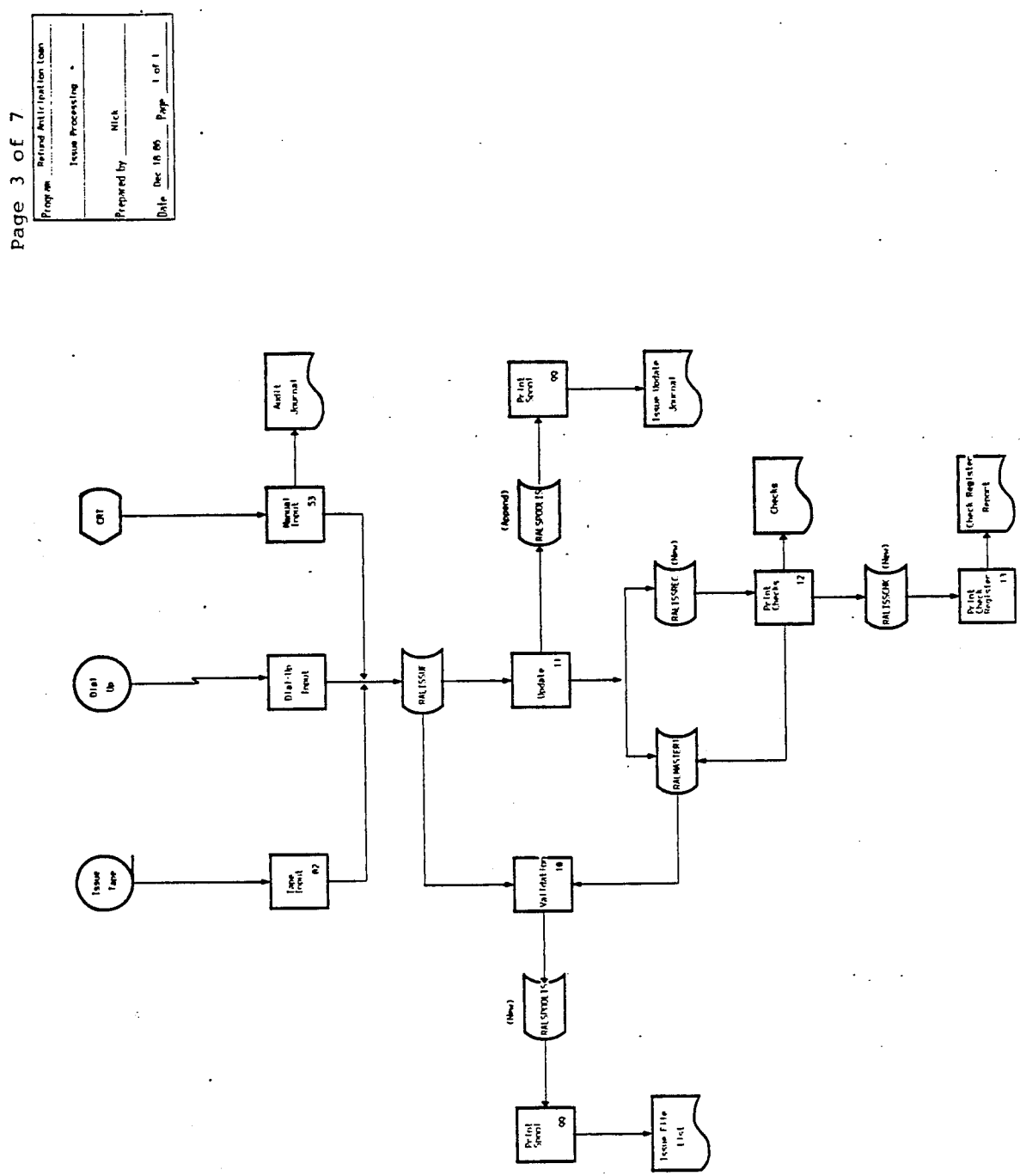

page 4 of 7
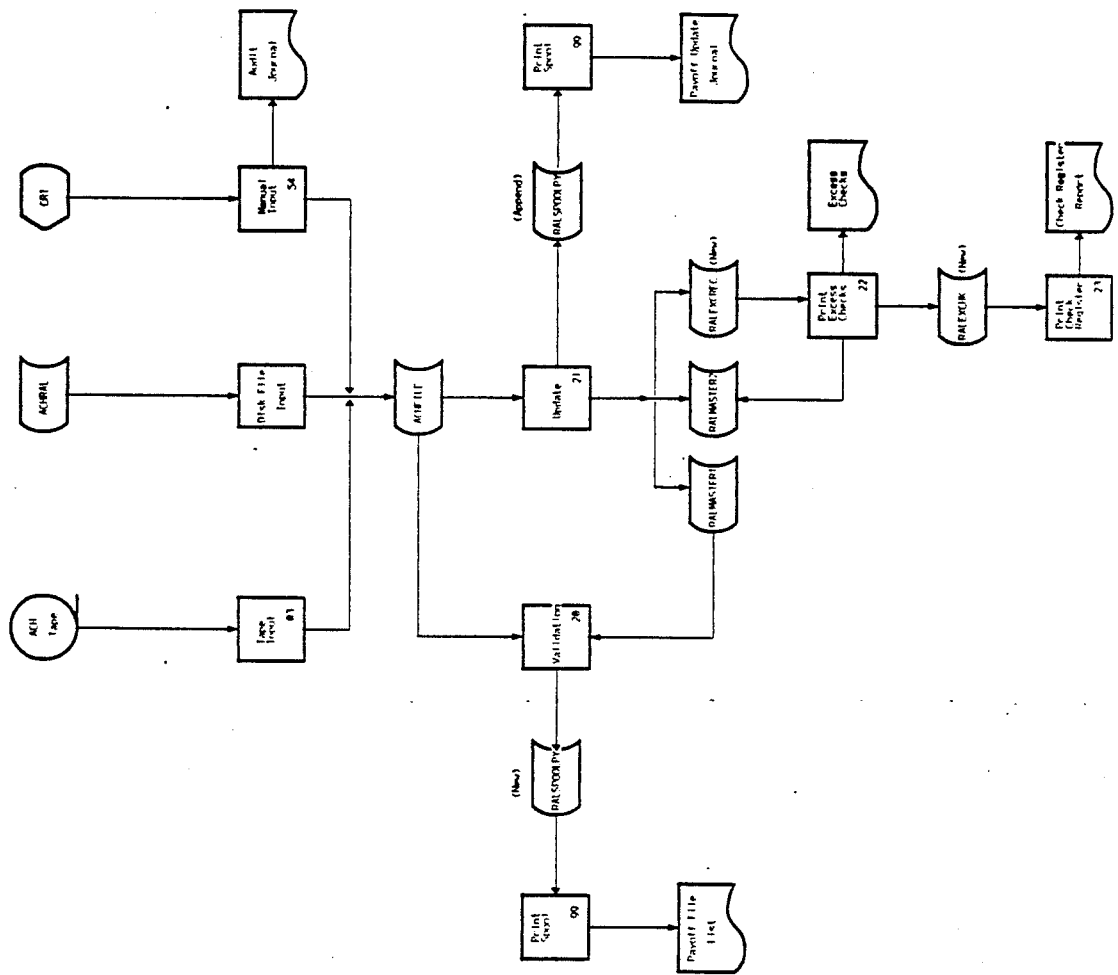

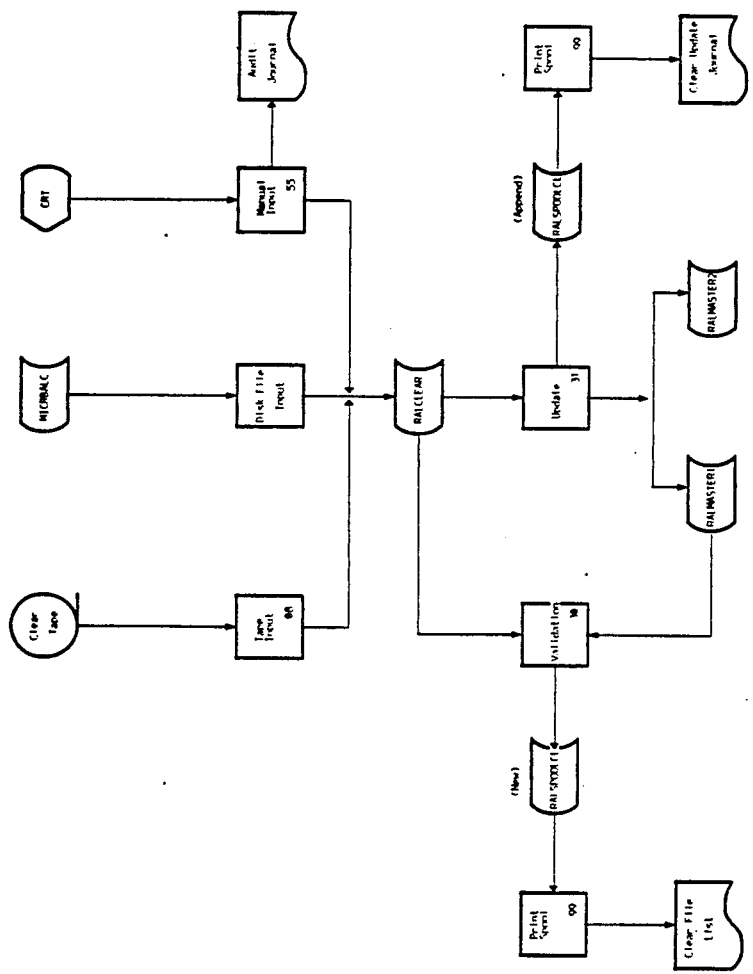

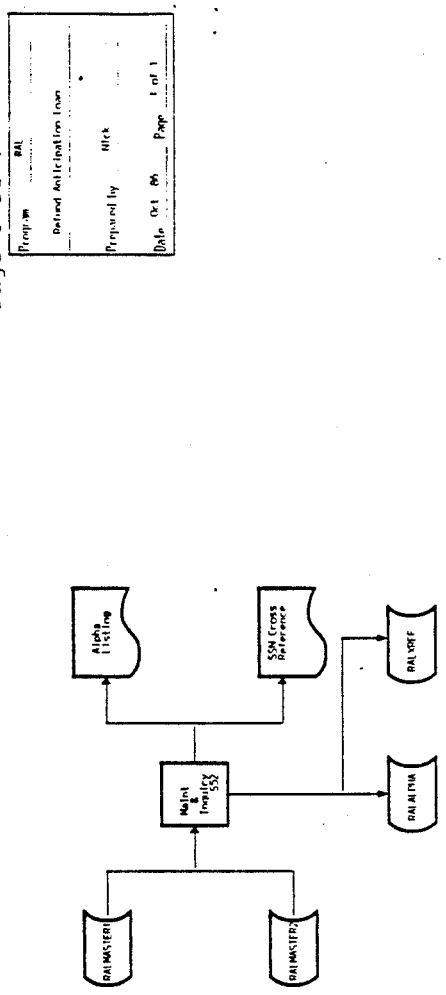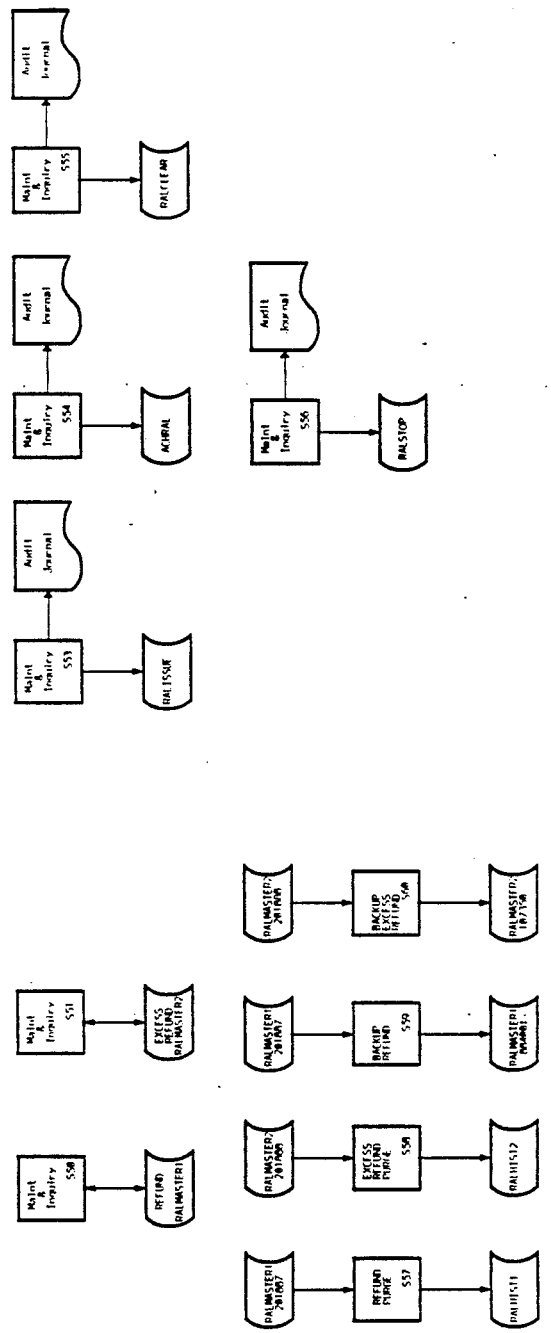

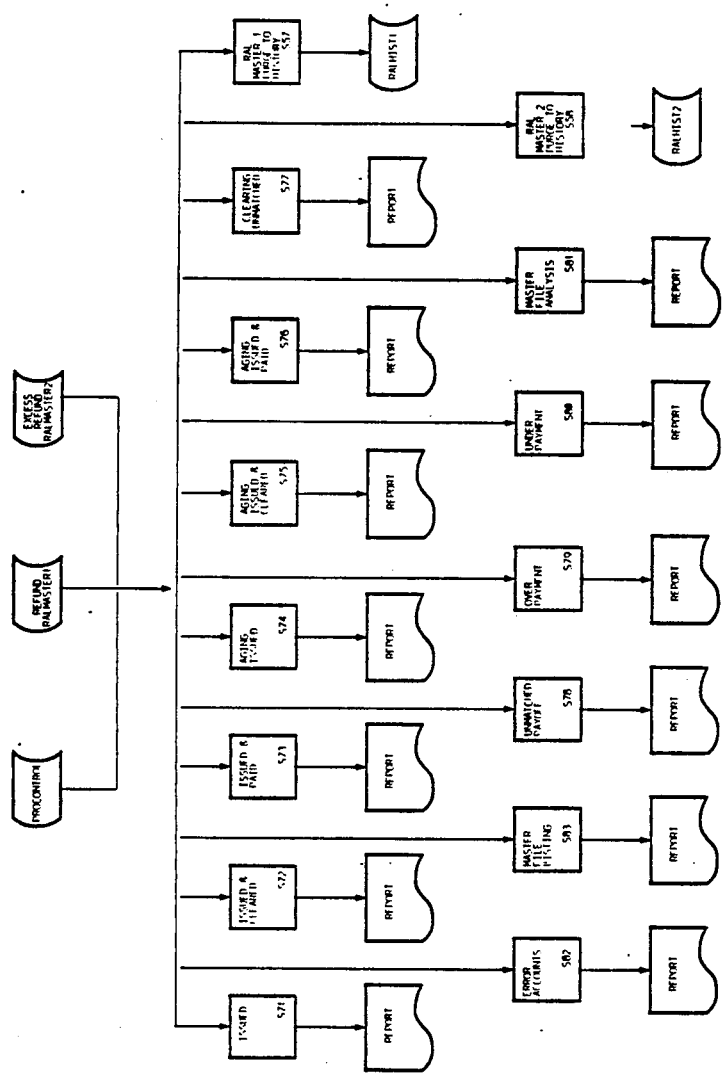

What is claimed is:

1. An electronic data processing system for electronic filing of income tax returns and authorizing tax refund payments comprising:
   a) at least one programmable electronic data processing means for executing programmed arithmetic and logical processes and storing data;
   b) at least one input means for inputting tax preparer data, tax return data and tax refund payment data to said at least one data processing means;
   c) program means executable by said at least one data processing means for processing said tax preparer data and said tax return data and creating electronic tax return data files;
   d) program means executable by said at least one data processing means for processing tax refund payment data and creating electronic deposit account files at an authorized financial institution;
   e) program means executable by said at least one data processing means for processing said tax return data files and said electronic deposit account files and for transmitting electronic tax return data to at least one electronic data processing means controlled by at least one tax collecting authority and designating said electronic deposit account file at the authorized financial institution as the recipient of electronic funds transfer data from at least one electronic data processing means controlled by at least one tax collecting authority;
   f) program means executable by said at least one data processing means for processing said tax return data files and said electronic deposit account files and authorizing payment by said financial institution of a tax refund amount from said deposit account upon electronic funds transfer of the refund payment by said tax collection authority; and
   g) program means executable by said at least one data processing means for electronically closing said electronic deposit account file after payment of the tax refund amount to the taxpayer.

2. The electronic data processing system of claim 1 wherein said input means includes keyboard input means, visual monitor means, data storage means, data transmission means and programmable data processing means for executing said program means for processing said tax preparer data and said tax return data and transmitting said electronic tax return data files and said payment data, to a remote processing center.

3. The electronic data processing system of claim 2 wherein said remote processing center includes at least one programmable data processing means for executing said program means for processing payment data and creating electronic deposit account files, for transmitting electronic tax return data to and for authorizing receipt of by said authorized financial institution electronic funds transfer data from, at least one electronic data processing means controlled by at least one tax collecting authority and for executing said program means for processing said tax return data files and said electronic deposit account files and program means for transmitting said files to said authorized financial institution for authorizing payment of a tax refund amount from said electronic deposit account whereby said payment made be made at a tax preparer site upon tax return processing and electronic funds transfer refund payment by said tax collecting authority.

4. The electronic data processing system of claim 1 further including program means for deducting processing fees from said refund amount and program means for transmitting at least a part of said fees by electronic funds transfer.

5. The method of claim 1 further comprising the steps of deducting processing fees from said refund amount and transmitting at least part of said fees by electronic funds transfer.

* * * * *